US008821095B2

(12) United States Patent
Johansen

(10) Patent No.: US 8,821,095 B2
(45) Date of Patent: Sep. 2, 2014

(54) SCREW ASSEMBLY AND METHOD FOR COMPONENT STACKING TOLERANCE CONTROL

(75) Inventor: Brian W. Johansen, McKinney, TX (US)

(73) Assignee: Raytheon Company, Waltham, MA (US)

(*) Notice: Subject to any disclaimer, the term of this patent is extended or adjusted under 35 U.S.C. 154(b) by 298 days.

(21) Appl. No.: 12/862,676

(22) Filed: Aug. 24, 2010

(65) Prior Publication Data
US 2012/0051869 A1 Mar. 1, 2012

(51) Int. Cl.
*F16B 5/02* (2006.01)
*F16B 35/04* (2006.01)
*H01Q 21/00* (2006.01)
*F16B 33/02* (2006.01)

(52) U.S. Cl.
CPC .............. *F16B 35/041* (2013.01); *H01Q 21/00* (2013.01); *F16B 5/0233* (2013.01); *F16B 2033/025* (2013.01)
USPC .......................................... 411/546; 343/893

(58) Field of Classification Search
USPC .......................................... 411/546, 535, 178
See application file for complete search history.

(56) References Cited

U.S. PATENT DOCUMENTS

| 4,043,239 | A  | * | 8/1977  | DeFusco ........................ 411/337 |
| 4,100,368 | A  | * | 7/1978  | Thomsen .................. 174/138 D |
| 4,573,733 | A  | * | 3/1986  | Zaydel .......................... 296/191 |
| 6,429,380 | B1 | * | 8/2002  | Lee et al. .................. 174/138 G |
| 6,669,422 | B1 | * | 12/2003 | Sterle ............................. 411/384 |
| 7,048,487 | B2 | * | 5/2006  | Stone ............................ 411/546 |
| 2007/0041808 | A1 | * | 2/2007 | Iwata et al. .................. 411/386 |

* cited by examiner

*Primary Examiner* — Flemming Saether
(74) *Attorney, Agent, or Firm* — Christie, Parker & Hale, LLP

(57) ABSTRACT

A screw assembly for maintaining a substantially constant gap between adjacent components includes a first screw including: an exterior surface including a first threaded surface; and an inner wall defining a bore, the bore being coaxial with a longitudinal axis of the first screw, the inner wall including a second threaded surface, wherein one of the first threaded surface or the second threaded surface is arranged with a right-hand thread, and the other one of the first threaded surface or the second threaded surface is arranged with a left-hand thread.

10 Claims, 5 Drawing Sheets

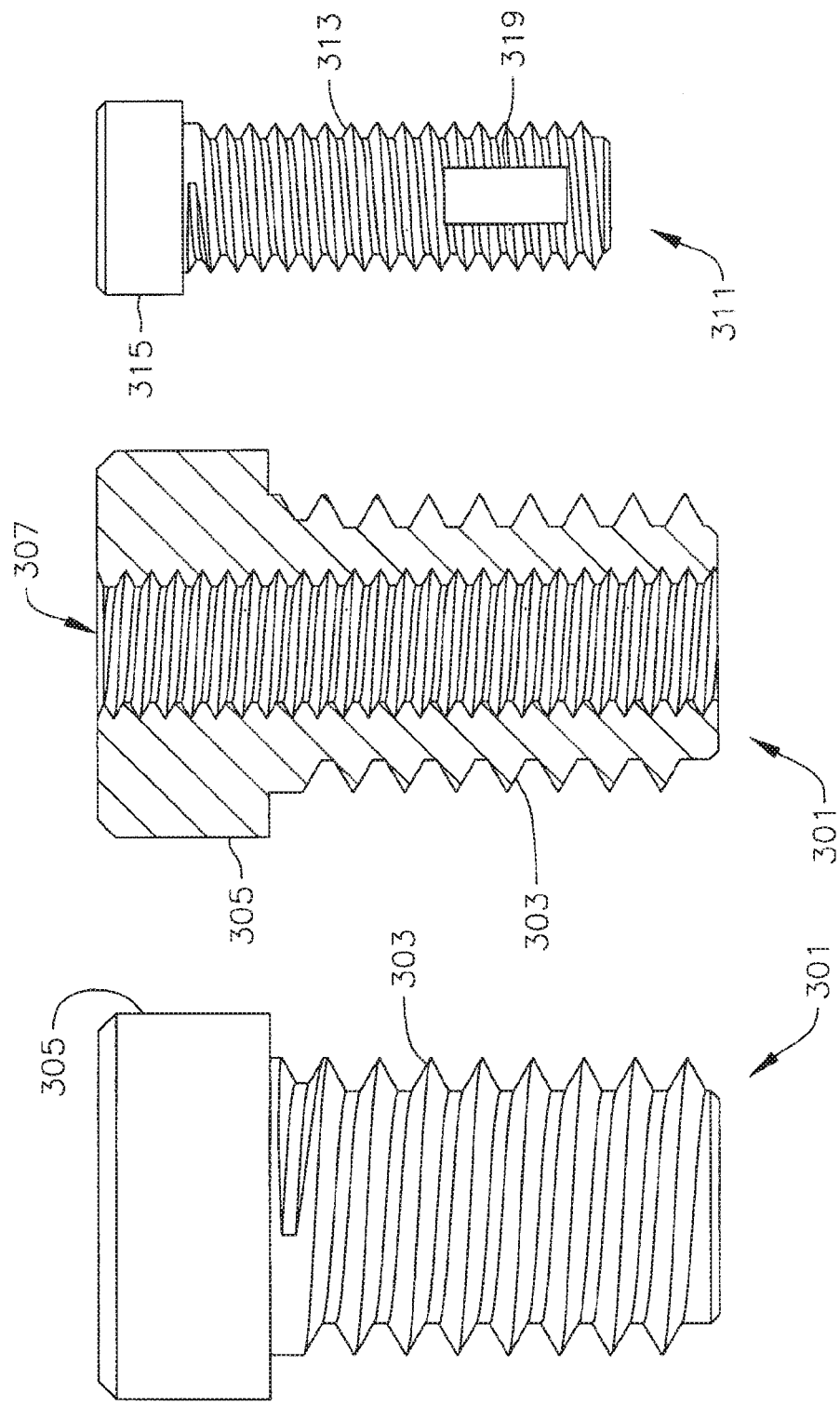

SCREW ASSEMBLY AND METHOD FOR COMPONENT STACKING TOLERANCE CONTROL

BACKGROUND OF THE INVENTION

1. Field of the Invention

The present invention relates generally to a screw assembly and method for controlling tolerances related to stacking components, and more particularly to a screw assembly and method which can provide for interlocking of adjacent components, while maintaining locational tolerances such as a constant spacing between the components.

2. Description of Related Art

Various mechanical applications involve adjacent structural components, some of which may be in contact with one another, and others which may instead be spaced apart from one another. In some situations where adjacent structural components are spaced apart, tight locational tolerances may play a significant role in performance or effectiveness of the particular application. That is, maintaining a particular spacing between components in some systems or applications may be important to the functionality of the system.

In some of these applications, a particular spacing between adjacent components may be difficult to establish and maintain without slight variations, for example, minor increases or decreases in the gap or spacing size. In these cases, it may be difficult to establish a stable structural connection between components, or a desired gap or spacing may be either too large or too small to create a sturdy or effective connection using traditional methods.

One such application may be in the field of phased array antennas, which have seen an increase in the range of application in recent years in fields such as the defense market, including applications in communications and radar systems, as well as in various other commercial markets. For example, a phased array antenna developed by the Raytheon company, may include a radiator having a plurality of transmit/receive integrated microwave module (TRIMM) plates or columns arranged in a column assembly, and a plurality of radiating elements extending from each of the columns in the column assembly. Polarization of such a phased array antenna depends on, for example, the orientation or the alignment of the electric field radiated by the phased array antenna. A particular array orientation generates a fixed electric field alignment across all the elements of the assembly, and as such, small variations in spacing between the columns in the column assembly may have a large impact on the effectiveness, stability, and/or optimization of certain performance characteristics of the phased array antenna. Therefore, positional precision is more important for certain portions of such column assemblies, for example, the radiating elements.

In these phased array antennas, if adjacent plates or columns are stacked to contact one another, the relative positioning between radiating elements may be affected by manufacturing variations in the plates or columns, for example, variations or inconsistencies in plate thicknesses. Furthermore, in such column assemblies, as the number of columns in the column assemblies increases, any plate inconsistencies may cause additional deviations from a desired spacing between the radiating elements, as error may be compounded based on the increased number of columns, and performance degradation of the antenna as a whole may further be magnified. As such, it may be desirable to provide a certain amount of clearance between adjacent plates, in order to eliminate or reduce spacing inconsistencies between the radiating elements that may be caused by manufacturing variations of the columns. In such arrangements, the columns can therefore be aligned according to positioning of the radiating elements, and the plates may then be secured in the desired positions to eliminate or reduce such variations.

SUMMARY OF THE INVENTION

Embodiments of the present invention provide a screw assembly and method for more effectively controlling tolerances related to stacking and interlocking components.

According to aspects of an embodiment of the present invention, a screw assembly for maintaining a substantially constant gap between adjacent components includes a first screw including: an exterior surface including a first threaded surface; and an inner wall defining a bore, the bore being coaxial with a longitudinal axis of the first screw, the inner wall including a second threaded surface, wherein one of the first threaded surface or the second threaded surface is arranged with a right-hand thread, and the other one of the first threaded surface or the second threaded surface is arranged with a left-hand thread.

The first screw may have a first end and a second end, and may further have a head portion positioned at the first end adjacent to the first threaded surface, wherein the bore has an opening at the first end on the head portion and extends towards the second end. The head portion may be substantially cylindrical. The opening may include a countersink.

At least one of the first threaded surface or the second threaded surface may include a flange portion.

The screw assembly may further include a second screw including: a shaft portion including a threaded surface; and a head portion positioned on one end of the shaft portion, wherein an outer diameter of the shaft portion corresponds to the an inner diameter of the bore of the first screw and the threaded surface of the second screw is arranged with a thread that corresponds to the thread of the second threaded surface of the first screw, and wherein an outer diameter of the head portion is greater than or equal to the outer diameter of the shaft portion.

The second screw may have a first end and a second end, wherein the head portion is positioned on the first end, and wherein a friction device is arranged on the shaft portion adjacent or near the second end.

The screw assembly may further include a first component and a second component, wherein the first screw is positioned in the first component and the second screw is positioned in the second component, and wherein the first screw and the second screw are configured to engage. The second screw may be configured to advance into the bore of the first screw when rotated in a first direction, and the first screw may be configured to advance out of a bore of the first component when rotated in the first direction. In an initial position the first screw may be positioned in a first bore of the first component and the second screw may be positioned in a second bore of the second component, and in a clamped position, the first screw and the second screw may be engaged such that an end of the first screw abuts the second component to prevent movement of the second component towards the first component, and the head portion of the second screw abuts the second component to prevent movement of the second component away from the first component.

According to aspects of another embodiment of the present invention, a method for maintaining a substantially constant gap between a first component and a second component includes: inserting a first screw into a bore of the first component, the first screw including an exterior threaded surface having a left-hand thread corresponding to a threaded surface of the bore of the first component, and an inner wall defining a bore and including a second threaded surface having a right-hand thread; aligning the second component to be adjacent to and separated by a gap from the first component, wherein a bore of the second component is substantially aligned with the bore of the first component; inserting a second screw into the bore of the second component and towards the first component, the second screw including a threaded surface having a right-hand thread corresponding to the second threaded surface of the first screw, and a head adjacent to the threaded surface; rotating the second screw in a clockwise direction to engage with the first screw; further rotating the second screw in the clockwise direction, wherein the second screw rotates the first screw in the clockwise direction and advances the first screw towards the second component until the first screw contacts a first surface of the second component; further rotating the second screw in the clockwise direction to advance the second screw into the bore of the first screw, until the head of the second screw contacts a second surface of the second component opposite the first surface.

An alignment device may align the second component with the first component and to maintain the gap.

The method may further include connecting the first component and the second component with at least a third screw spaced apart from the first screw and the second screw.

A third screw configured to be substantially the same shape as the first screw may be inserted into the second component, and a fourth screw configured to be substantially the same shape as the second screw may be inserted into a third component, wherein the third screw and the fourth screw engage and clamp the second component and the third component together while maintaining a substantially constant gap corresponding to the substantially constant gap between the first component and the second component.

BRIEF DESCRIPTION OF THE DRAWINGS

The accompanying drawings, together with the specification, illustrate exemplary embodiments of the present invention, and, together with the description, serve to explain the principles of the present invention, of which:

FIGS. 4A and 4B illustrate a side view and a cross-sectional view of a set screw from the screw assembly of FIG. 3;

FIG. 5 illustrates a side view of a screw from the screw assembly of FIG. 3;

DETAILED DESCRIPTION OF THE INVENTION

Figure 1:
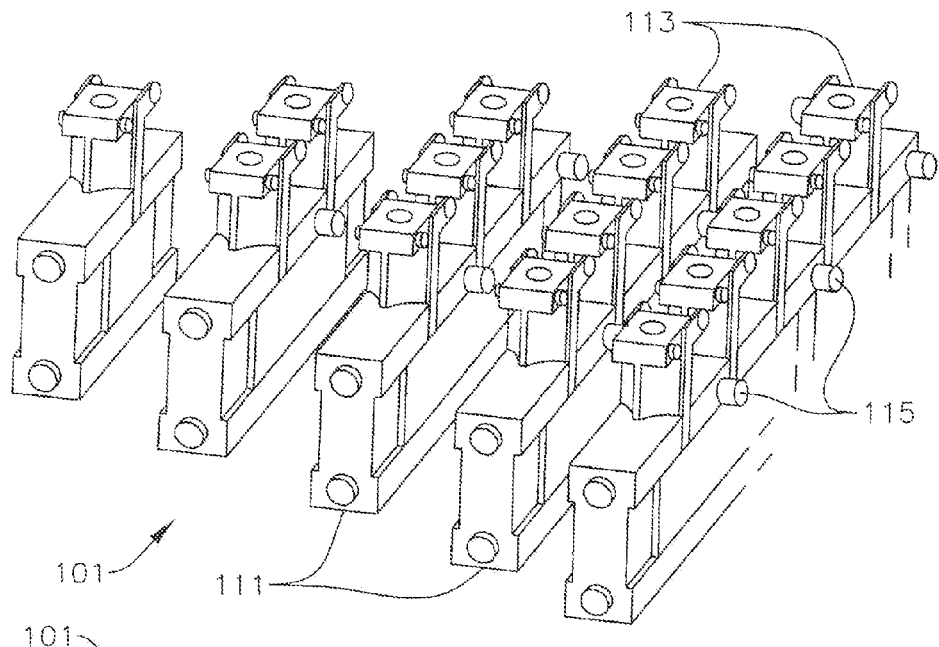
FIG. 1 shows an exploded perspective view of a portion of a column assembly of a phased array antenna in accordance with an embodiment of the present invention.

Hereinafter, certain exemplary embodiments according to the present invention will be described with reference to the accompanying drawings. Some of the elements that are not essential to the complete understanding of the present invention are omitted for clarity. In addition, similar elements that appear in different drawings may be referred to by using the same or similar reference numerals.

Figure 2:
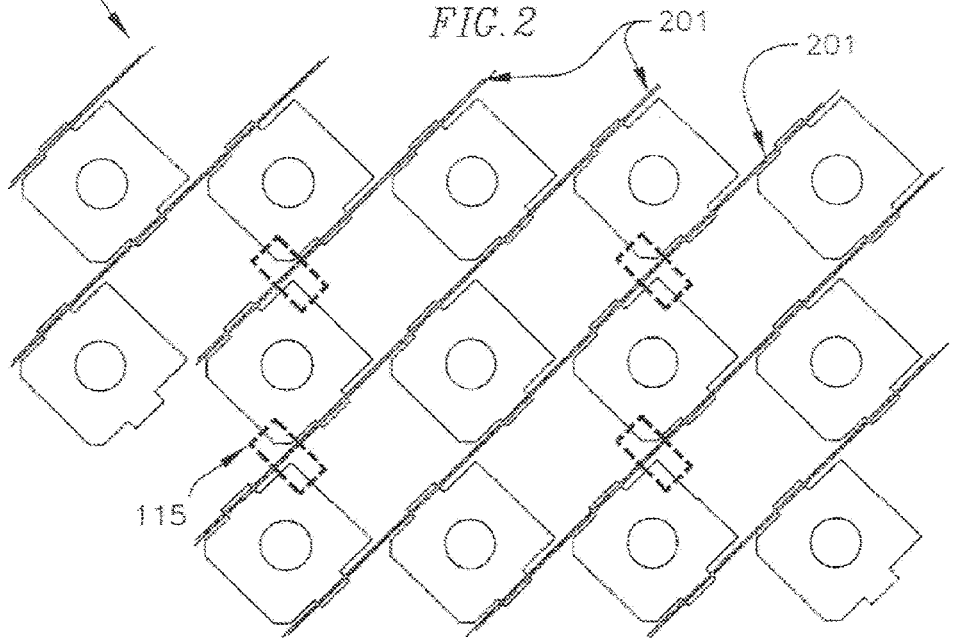
FIG. 2 schematically illustrates a top view of a column assembly of a phased array antenna in accordance with an embodiment of the present invention.

FIG. 1 is an exploded perspective view of a portion of a column assembly of a phased array antenna in accordance with an embodiment of the present invention, and FIG. 2 is a schematic illustration of a top view of an assembled column assembly of a phased array antenna in accordance with an embodiment of the present invention. Phased array antennas having column assemblies similar to the column assemblies 101 illustrated in FIGS. 1 and 2 have been developed by the Raytheon company, and include a plurality of TRIMM plates or columns 111, which may be arranged adjacent to each other and spaced apart from one another. Each of the plates or columns 111 may include a plurality of supports 113 for inserting or installing radiating elements associated with the phased array antenna. Other elements may be associated with the phased array antennas, for example, feeds for electrically connecting the plates or columns 111, and interconnecting elements 115 for holding the plates or columns 111 together and/or spaced apart at a substantially constant distance from one another.

In a phased array antenna such as the one described above, polarization of the antenna depends on the orientation and/or alignment of the electric field radiated by the elements of the phased array antenna. This, in turn, may depend on, for example, a spacing between the plates and/or their associated radiating elements, the electrical and/or mechanical intercommunication between the various elements, and/or the shape of the radiating elements. For example, in the phased array antenna of FIGS. 1 and 2, when the column assembly 101 is in an assembled state, gaps 201 may exist between adjacent columns 111. Such gaps may be used, for example, to provide clearance for feeds located between the columns which electrically connect the columns and their associated radiating elements and/or other elements that are positioned between the columns, or for example, to provide an exact spacing to accomplish a desired alignment between said radiating elements. Since accurate alignment of the radiating elements, rather than of the columns, is typically desirable, the gaps 201 may also serve to reduce or eliminate variations in the spacing of the radiating elements from, for example, inconsistencies or discrepancies between the thickness of the columns 111 due to, for example, manufacturing variances. Therefore, the gaps 201 can insure a more accurate spacing of the radiating elements, independent of the actual shapes or spacing between the columns 111 themselves. Additionally, the gaps 201 may exist between adjacent columns 111, for example, to improve electrical communication between columns across the feeds, and to discourage potential cross-talk between other portions or elements of the columns themselves.

After installation of a particular phased array antenna, arrangement of the antenna elements will result in a fixed electric field alignment across all the elements of the array assembly. As such, small variations in spacing between the columns in the column assembly will affect the fixed electric field. Furthermore, as the number of plates or columns 111 in a column assembly increases, any variations exhibited between any two of the columns 111 in an assembly may be compounded and magnified across the entire column assembly, having a large and potentially debilitating impact on the effectiveness, stability, and/or optimization of certain performance characteristics of the phased array antenna. Accordingly, an accurate positioning between the radiating elements of adjacent columns becomes even more significant.

Therefore, in an application such as the phased array antenna described above, it may be desirable to implement a screw assembly which can maintain a desired or predetermined gap or distance 201 between two adjacent elements (e.g., columns 111 in the above example), such that any undesired variations between such spacing can be reduced or minimized, in order to improve performance of the system or application. Furthermore, with an adjustable screw assembly, variations in the gaps 201 between the columns 111 themselves can be more readily navigated, such that the screw assembly can be adjusted to bridge a wide range of distances between adjacent columns 111, and then effectively maintain a particular distance. While the above system serves as an example in which embodiments of the present invention can be applied, it is to be understood that the application of the embodiments of the present invention should not be limited to the above system, and that the present invention can be applied to various other applications in which it may be desirable, for example, to maintain and effectively control tolerances associated with a preferred spacing between adjacent stacked elements.

Figure 3:
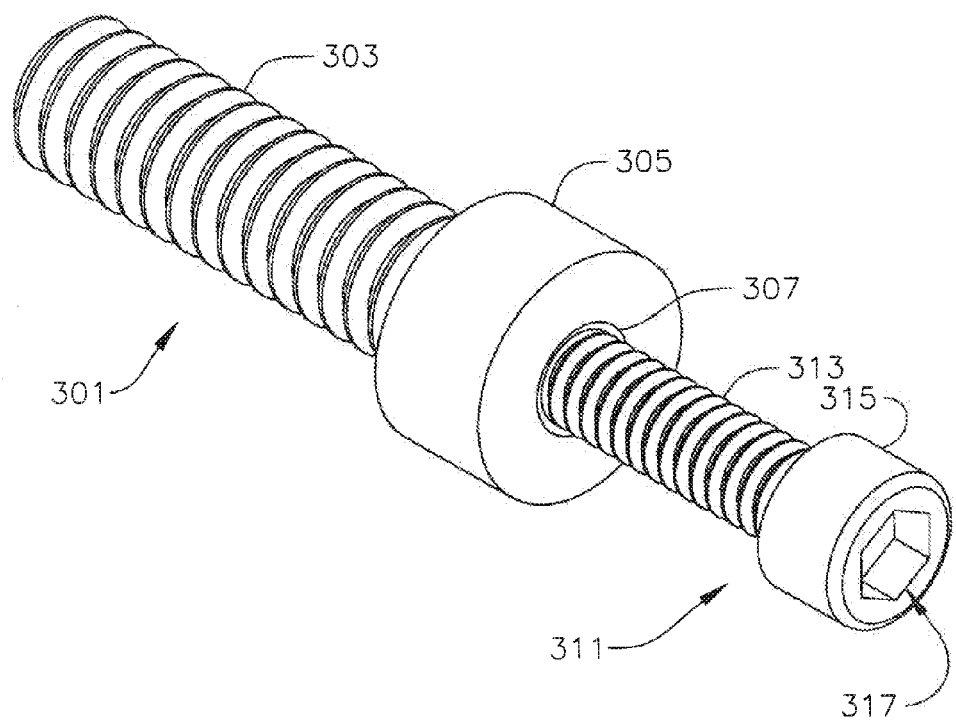
FIG. 3 shows a perspective view of a screw assembly in accordance with an embodiment of the present invention.

Description of a screw assembly including set screw 301 and screw 311 in accordance with an embodiment of the invention will be described herein, with reference to FIGS. 3-5. FIG. 3 shows a perspective view of a screw assembly in accordance with an embodiment of the present invention. Referring to FIG. 3, an embodiment of the screw assembly includes a set screw 301 and a screw 311. FIG. 4A illustrates a side view of a set screw, for example, the set screw 301 from FIG. 3, while FIG. 4B illustrates a cross-sectional view of a set screw, for example, the set screw 301 from FIG. 3, in accordance with an embodiment of the present invention. Meanwhile, FIG. 5 illustrates a side view of a screw, for example, the screw 311 from FIG. 3, in accordance with an embodiment of the present invention.

Referring to FIGS. 3, 4A, and 4B, set screw 301 includes a threaded shaft 303. In some embodiments, such as in the illustrated embodiments, the set screw 301 may include a substantially cylindrical head region 305 on one end of the shaft 303. In some embodiments, the head region 305 may have a diameter that is substantially equal to or larger than a diameter of the threaded shaft 303. In these embodiments, the substantially cylindrical head region 305 may have a substantially smooth exterior. The set screw 301 may also include a threaded bore 307 that is arranged to be substantially coaxial with a longitudinal axis of the set screw 301. The threaded bore 307 may extend along an entire length of the set screw 301, including the threaded shaft portion 303, as well as the head portion 305 in embodiments which include such a head portion. As such, the threaded bore 307 may include openings on opposite ends of the set screw 301. In some embodiments, the threaded bore 307 may include a countersink approximate at least one of the openings (e.g., as seen near the opening on the head portion 305 in FIGS. 3 and 4B). The countersink may promote or facilitate alignment and mating of the screw 311 upon insertion of the screw 311 into the bore 307 of the set screw 301.

In embodiments of the present invention, the set screw 301 may be configured such that the thread on threaded shaft 303 is arranged to be threaded in a different direction than the thread on the threaded bore 307. That is, in embodiments where the threaded shaft 303 on the outside of set screw 301 is a left-hand thread, the threaded bore 307 on the inside of set screw 301 will be arranged to have a right-hand thread. Correspondingly, in the above-described embodiment, the screw 311 is configured to have its own threaded shaft portion 313 which is threaded with a right-hand thread and sized to correspond to the threaded bore 307 of the set screw 301. That is, the threaded shaft 303 of set screw 301 and the threaded shaft 313 of screw 311 will be arranged in opposite directions.

Referring to FIGS. 3 and 5, in addition to the threaded shaft 313, the screw 311 may also include a head portion 315. The head portion 315 may also be substantially cylindrical and have a diameter that is greater than or equal to a diameter of the threaded shaft 313 of screw 311. Generally, a maximum diameter of screw 311 will be equal to or smaller than a maximum diameter of the set screw 301. The head portion 315 of screw 311 may include one of a number of different interfaces for rotation or advancement of the screw 311. The interface of screw 311 illustrated in FIG. 3 is illustrated in the form of a hexagonal socket 317, but in other embodiments, the interface may be, for example, a flathead socket, a Philips socket, or various other types of interfaces. The structure of the screw 311 is generally solid, and screw 311 typically will not have a bore similar to the bore 307 implemented into set screw 301. Furthermore, the screw 311 may also include a friction device 319 on threaded shaft 313, for increasing friction with the set screw 301 upon engagement with the set screw 301. The friction device 319 may be one of a variety of different devices which may cause friction upon contact with threaded bore 307 of set screw 301, for example, a fastener coating such as Nylok, or for example, a change or inconsistency in the threads of the threaded shaft 313. Various other types of friction devices 319 may also be applied to screw 311, and as such, friction device 319 is schematically illustrated in FIG. 5 as a block.

Figure 6A:
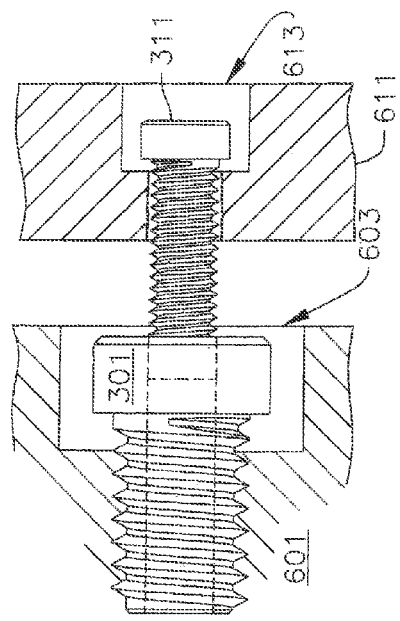
FIGS. 6A-6D illustrate a method of interlocking adjacent components using a screw assembly in accordance with an embodiment of the present invention.
Figure 6C:
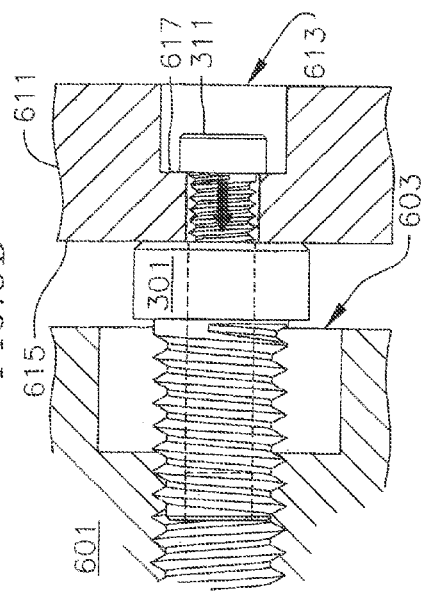
Figure 6B:
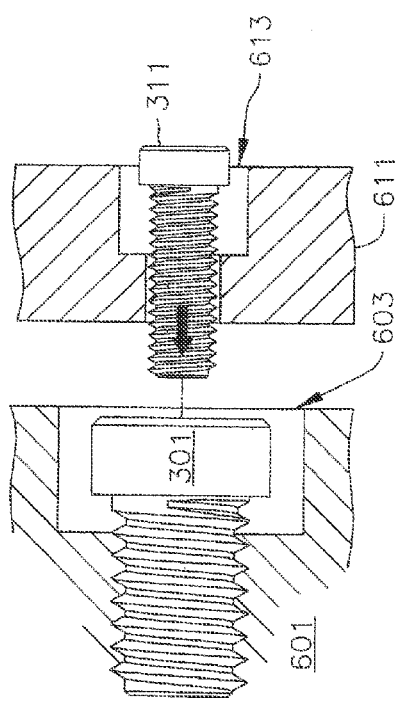
Figure 6D:
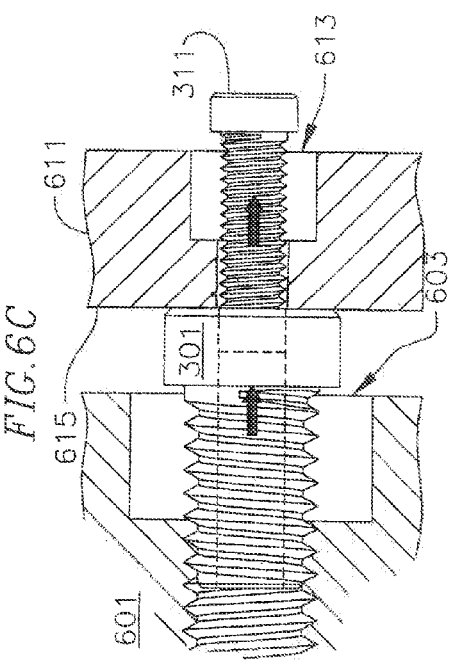
Figure 7:
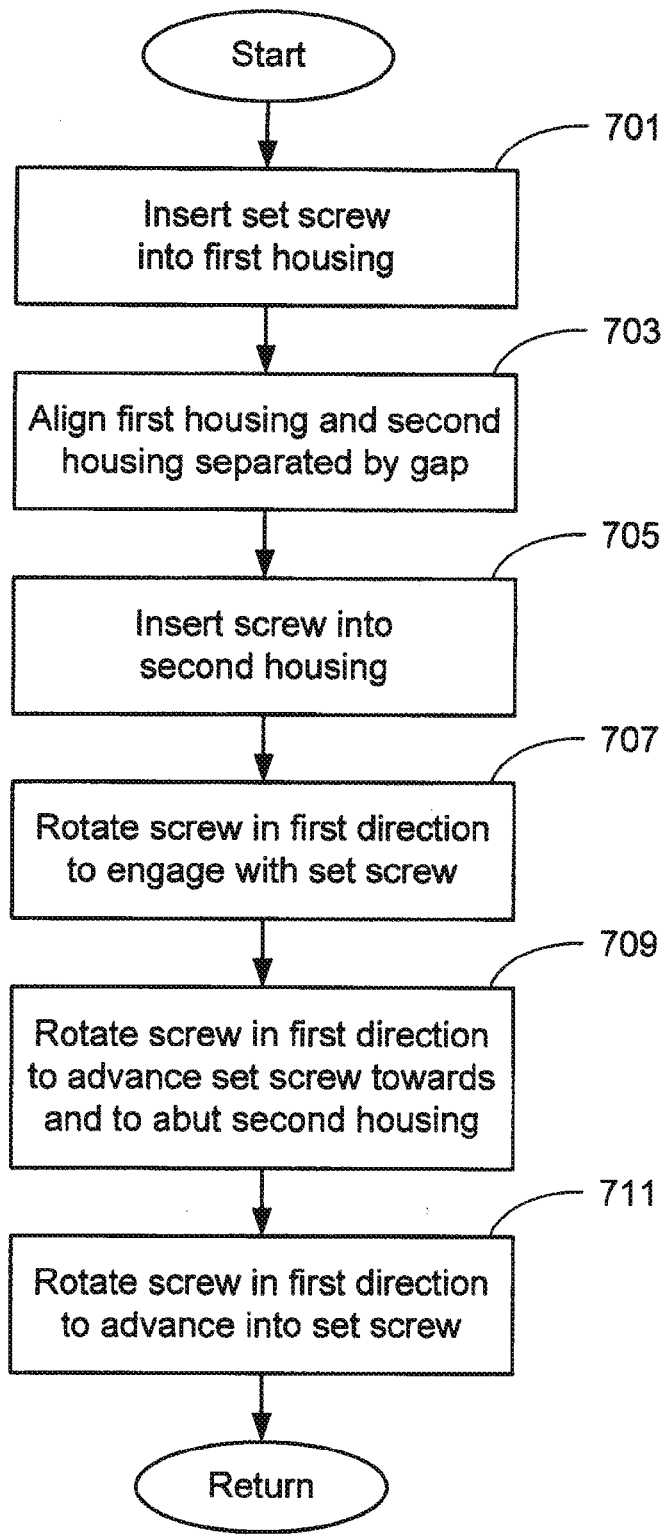
FIG. 7 is a block diagram showing a method of interlocking adjacent components using a screw assembly in accordance with an embodiment of the present invention.

Operation of the screw assembly will now be described, with reference to FIGS. 6A-6D and 7. FIGS. 6A-6D illustrate steps for a method of interlocking adjacent components using a screw assembly in accordance with an embodiment of the present invention, including cross-sectional views of two adjacent housings and incorporation of a screw with a set screw of a screw assembly. FIG. 7 is a corresponding block diagram showing a method of interlocking adjacent components using a screw assembly in accordance with an embodiment of the present invention.

Referring to FIG. 7, in block 701, a set screw is inserted and screwed into a threaded bore of a first housing. An example is illustrated in FIG. 6A, where set screw 301 is inserted into a threaded bore 603 of a first housing 601. First housing 601 may be one of two adjacent plates, for example, plates similar to plates 111 as described with reference to FIGS. 1 and 2, or may be any of various other types of components or housings. Bore 603 is threaded to correspond to threaded shaft 303 of set screw 301. In some embodiments, set screw 301 may be inserted into bore 603 during manufacture of housing 601. In other embodiments, set screw 301 may be inserted into bore 603 just prior to installation of the screw assembly to hold two adjacent housings together. In embodiments where threaded shaft 303 of set screw 301 is a left hand-thread, screwing-in of set screw 301 into housing 601 involves counter-clockwise rotation of set screw 301.

In block 703, the first housing 601 is aligned with a second housing 611, as also illustrated in FIG. 6A. The first housing 601 and the second housing 611 may be aligned and held, such that a preferred gap or distance separates them, as described with reference to FIGS. 1 and 2. Maintaining of a constant desired distance may be achieved, for example, by an alignment jig that maintains the distance between two adjacent housings during assembly of the column assembly. In other embodiments, various other structures and methods may be used to hold adjacent plates or housings together prior to installation of the screw assemblies. Furthermore, in some embodiments, the bores 603 of housings 601 may be below or outside a visual surface of the housing 601, such that when an adjacent housing 611 is positioned at a desired spacing from housing 601, the set screws 301 that were inserted in housing 601 may be concealed from view.

In block 705, a screw 311 is inserted into a bore 613 of the second housing 611, which is sized to correspond to the threaded shaft 313 of screw 311. Referring to FIG. 6A, insertion of screw 311 into bore 613 of housing 611 advances screw 311 towards set screw 301. In some embodiments, bore 613 of second housing 611 may be threaded, with a right-hand thread to correspond to threaded shaft 313 of screw 311. In other embodiments, bore 613 may not be threaded, and may be sized, for example, to be slightly larger than a largest diameter of the threaded shaft 313 of screw 311, such that screw 311 can freely move in bore 613.

In block 707, the screw is rotated in a first direction with, for example, a screwing-in tool corresponding to an interface or socket on the screw, to engage the screw with the set screw. In these embodiments, bore 613 of housing 611 will be substantially aligned with bore 603 of first housing 601. Referring to previously described embodiments where the threaded shaft 311 of screw 313 is a right-hand thread, upon contact of screw 311 with set screw 301, clockwise rotation of screw 311 will cause screw 311 to engage set screw 301 and advance a first distance into bore 307 of set screw 301, for example, as illustrated in FIG. 6B. In the previously described embodiments in which set screw 301 is out of view after alignment of housings 601 and 611, engagement of screw 311 with set screw 301 may further be facilitated by a countersink at the opening of bore 307 of set screw 301 as previously described. In these embodiments of the present invention, blind access and adjustment control of the screw assembly can be achieved, such that engagement and adjustment of the screw assembly can be accomplished while the set screw 301 and the interface between set screw 301 and screw 311 are out of view.

As previously discussed, in some embodiments, at least a portion of threaded shaft 313 of screw 311 and/or approximate bore 307 of set screw 301 may be coated with, for example, Nylok, or any of various other fastener coatings or compounds which may serve to increase a frictional force between the surfaces of threaded shaft 313 of screw 311 and threaded bore 307 of set screw 301. Friction may alternatively be established, for example, by a manipulation or variation in the thread or thread spacing of either the threaded shaft 313 of screw 311 or the threaded bore 307 of set screw 301, or by any of various other friction devices 319. This may induce, for example, a temporary hold between screw 311 and set screw 301, such that continued rotation of the screw 311 will also result in corresponding rotation of the set screw 301.

In block 709, rotation of screw 311 continues in a same direction as the rotation in block 707. That is, in previously described embodiments, since screw 311 was rotated in a clockwise direction, rotation of screw 311 continues in the clockwise direction in block 709. Conversely, in embodiments in which screw 311 is rotated in a counter-clockwise direction in block 707, continued rotation of screw 311 in the counter-clockwise direction would occur in block 709. Due to the friction between screw 311 and set screw 301 caused by, for example, the friction device 319 on screw 311 or set screw 301 as described in reference to block 707, continued rotation of screw 311 will also cause a corresponding rotation of set screw 301. As described above with respect to FIGS. 1, 2, and 6A, in embodiments where threaded shaft 313 of screw 311 is a right-hand thread, threaded shaft 303 of set screw 301 will conversely be a left-hand thread. Therefore, rotation of set screw 311 in a clockwise direction will cause the screw 311/set screw 301 combination to advance away from first housing 601, such that set screw 301 begins to rotate out of bore 603 of first housing 601 and towards a surface 615 of second housing 611 that faces first housing 601, as seen in FIG. 6C. Continued rotation of the screw 311/set screw 301 combination in the clockwise direction will eventually result in substantially cylindrical head portion 305 of set screw 301 contacting or abutting against the surface 615 of the second housing 611. Upon contact of the head portion 305 of set screw 301 against the surface 615 of the second housing 611, advancement of the set screw 301 away from the first housing 601 stops. At this point, a substantially fixed positioning is established between the first housing 601 and the set screw 301, such that and end of the set screw 301 nearest to the second housing 611 serves as an abutment or support for maintaining a minimum distance or gap between the first housing 601 and the second housing 611.

In block 711, after abutment of set screw 301 against surface 615, rotation of screw 311 is further continued in the same direction as rotation in blocks 707 and 709. Therefore, in the embodiments previously described, rotation of set screw 311 continues on a clockwise direction. Here, a force of the second housing 611 pushing against the set screw 301 and preventing further advancement of the set screw 301 away from the first housing 601 is generally greater than a force holding the screw 311 and set screw 301 together, for example, by the friction device 319 as previously described. Furthermore, since the distance between the first housing 601 and the second housing 611 may be additionally fixed or supported by, for example, an alignment jig in some embodiments, such additional support may also deter or prevent further movement of the set screw 301 away from the first housing 601.

Accordingly, after abutment of head portion 305 of set screw 301 with surface 615 of the second housing 611, the abutment causes release of the temporary hold between screw 311 and set screw 301 (e.g., from the friction device 319), such that screw 311 may thereafter freely rotate independent of set screw 301. As described above, at this point, set screw 301 is deterred from further advancement away from the first housing 601 and maintains a minimum distance or gap between first housing 601 and second housing 611. After release of the temporary hold between screw 311 and set screw 301, the continued clockwise rotation of screw 311 therefore advances screw 311 further into bore 307 of set screw 301, as seen in FIG. 6D. Rotation of screw 311 is continued until a side of head portion 315 of screw 311 comes into contact with a second side or face 617 of the second housing 611 adjacent to the bore 613. In other words, screw 311 may be advanced into set screw 301 until screw 311 has been tightened against side 617 of the second housing 611.

Such a tightened configuration, as illustrated in FIG. 6D, can be viewed as a clamped position, where the distance between the first housing 601 and the second housing 611 has been substantially fixed, such that the head portion 305 of the set screw 301 substantially prevents movement of the second housing 611 any closer to the first housing 601, while the head portion 315 of the screw 311 substantially prevents movement of the second housing any further away from the first housing 601. As such, a desired or preferred gap between the first housing 601 and the second housing 611 can be maintained. Thereafter, in embodiments where an alignment jig or other device or mechanism was utilized to hold the housings together during application of the screw assembly, said device or mechanism can be removed.

In embodiments where multiple adjacent columns or components are stacked, implementation of the screw assembly or assemblies can be sequentially performed, such that after two adjacent components have been clamped together, a third component can then be clamped to one of the two adjacent components, and a fourth component can then be clamped to the third component, etc. Such assembly can continue until the desired number of components have been stacked and clamped together, such that a constant column to column tolerance gap can be achieved and maintained. As discussed above, it is generally understood that, as the number of components or elements in a particular assembly increases, the gap variations and tolerances between each pair of adjacent components causes the total variance in the assembly to increase and get compounded. Where performance of a particular application is dependent on, for example, an exact spacing between components, such as with respect to column assemblies for phased array antennas as described above, the screw assemblies in accordance with aspects of the present invention can reduce or minimize errors or variations associated with the gaps between adjacent components, such that a significant number of additional components may be added to the stack, while maintaining the desired tolerance control, such that performance of the phased array antennas can be improved.

In embodiments of the present invention, a screw assembly can be utilized to stack components and to control tolerances associated with maintaining a preferred distance or gap between adjacent components in a stack. By utilizing an adjustable screw assembly according to embodiments of the present invention, components may be held at a desired distance, independent of and irrespective of manufacturing tolerances of the components themselves. Such a screw assembly may also be beneficial, for example, where a desired gap between components may be too great to maintain and keep substantially constant when no additional structural connections are implemented. Furthermore, in certain applications, the additional structural tie between components provided by the screw assemblies according to embodiments of the present invention may improve the stability of column assemblies or other structures, and to help them meet certain performance characteristics, such as tactical vibration requirements.

In some embodiments, the assemblies described above may be modified, or additional features may be added to or supplement the assemblies, without departing from the spirit or scope of the present invention. For example, in some embodiments, flanges may be used on one or more of the screw elements instead of screw threads. In other embodiments the screw assemblies may further be supplemented by regular screw elements positioned at other portions of adjacent components. In such embodiments, the screw assemblies according to an embodiment of the present invention may first be installed to maintain a particular distance or gap between adjacent components, and regular screw elements may then be installed to provide additional structural support between the adjacent components after the desired gap has been established.

While the present invention has been described in connection with certain exemplary embodiments, it is to be understood that the invention is not limited to the disclosed embodiments, but is intended to cover various modifications and equivalent arrangements included within the spirit and scope of the appended claims, and equivalents thereof.

What is claimed is:

1. A phased array comprising at least three adjacent plates each comprising at least one support structure for a radiating element of the antenna and two opposing sides facing respective adjacent plates of the antenna, wherein the opposing sides of each of the plates are different from one another, and a screw assembly for maintaining a substantially constant gap between the support structures of the at least three adjacent plates, the screw assembly comprising:
   a first screw comprising:
      an exterior surface comprising a first threaded surface; and
      an inner wall defining a bore, the bore being coaxial with a longitudinal axis of the first screw, the inner wall comprising a second threaded surface,
      wherein one of the first threaded surface or the second threaded surface is arranged with a right-hand thread, and the other one of the first threaded surface or the second threaded surface is arranged with a left-hand thread;
   a second screw configured to engage the second threaded surface of the first screw to maintain a substantially constant gap between the respective support structures of the first and second plates;
   a third screw comprising an exterior surface comprising a third threaded surface arranged with one of a right-hand thread or a left-hand thread, and an inner wall defining a bore coaxial with a longitudinal axis of the third screw and comprising a fourth threaded surface with the other one of a right-hand thread or a left hand thread;
   a fourth screw configured to engage the fourth threaded surface of the third screw to maintain the same substantially constant gap between the respective support structures of the second and third plates;
   wherein the second plate has a first bore configured to receive the second screw and a second bore having a different profile than the first bore configured to receive the third screw; and
   wherein a gap between the respective sides of the first and second plates is different from a gap between the respective sides of the second and third plates.

2. The screw assembly of claim 1, wherein the first screw has a first end and a second end, and further comprises a head portion positioned at the first end adjacent to the first threaded surface, and wherein the bore has an opening at the first end on the head portion and extends towards the second end.

3. The screw assembly of claim 2, wherein the head portion is substantially cylindrical.

4. The screw assembly of claim 2, wherein the opening includes a countersink.

5. The screw assembly of claim 1, wherein the second screw comprises:
   a shaft portion comprising a threaded surface; and
   a head portion positioned on one end of the shaft portion,
   wherein an outer diameter of the shaft portion corresponds to the an inner diameter of the bore of the first screw and the threaded surface of the second screw is arranged with a thread that corresponds to the thread of the second threaded surface of the first screw, and
   wherein an outer diameter of the head portion is greater than or equal to the outer diameter of the shaft portion.

6. The screw assembly of claim 5, wherein the second screw has a first end and a second end, wherein the head portion is positioned on the first end, and wherein a friction device is arranged on the shaft portion adjacent or near the second end.

7. The screw assembly of claim 1, wherein the first screw is configured to be positioned in the first plate.

8. The screw assembly of claim 7, wherein the second screw is configured to advance into the bore of the first screw when rotated in a first direction, and the first screw is configured to advance out of a bore of the first plate when rotated in the first direction.

9. The screw assembly of claim 7, wherein in an initial position the first screw is positioned in a first bore of the first plate and the second screw is positioned in a second bore of the second plate, and wherein in a clamped position, the first screw and the second screw are engaged such that an end of the first screw abuts the second plate to prevent movement of the second plate towards the first plate, and the head portion of the second screw abuts the second plate to prevent movement of the second plate away from the first plate.

10. A method for maintaining distances between support structures configured to hold radiating elements of a phased array antenna, the antenna comprising at least three adjacent plates each comprising at least one said support structure and two opposing sides facing respective adjacent plates of the antenna, wherein the opposing sides of each of the plates are different from one another, and wherein the method maintains a substantially constant gap between the support structure of a first one of the plates and the support structure of a second one of the plates, and for maintaining the same substantially constant gap between the support structure of the second plate and the support structure of a third one of the plates, the method comprising:

inserting a first screw into a bore of the first plate, the first screw comprising an exterior threaded surface having a left-hand thread corresponding to a threaded surface of the bore of the first plate, and an inner wall defining a bore and comprising a second threaded surface having a right-hand thread;

aligning the second plate to be adjacent to the first plate, wherein the respective support structures of the first and second plates are separated by the substantially constant gap, and wherein a first bore of the second plate is substantially aligned with the bore of the first plate;

inserting a second screw into the first bore of the second plate and towards the first plate, the second screw comprising a threaded surface having a right-hand thread corresponding to the second threaded surface of the first screw, and a head adjacent to the threaded surface;

rotating the second screw in a clockwise direction to engage with the first screw;

further rotating the second screw in the clockwise direction, wherein the second screw rotates the first screw in the clockwise direction and advances the first screw towards the second plate until the first screw contacts a first surface of the second plate;

further rotating the second screw in the clockwise direction to advance the second screw into the bore of the first screw, until the head of the second screw contacts a second surface of the second plate opposite the first surface;

aligning the third plate to be adjacent to the second plate, wherein the respective supports structures of the second and third plates are separated by the same substantially constant gap, and wherein a bore of the third plate is substantially aligned with a second bore of the second plate, and wherein the second bore of the second plate is holding a third screw configured substantially the same as the first screw;

inserting a fourth screw configured substantially the same as the second screw into the bore of the third plate and towards the second plate;

rotating the fourth screw to engage with the third screw;

further rotating the fourth screw to rotate the third screw and to advance the third screw towards the third plate until the third screw contacts the third plate; and further rotating the fourth screw to advance the fourth screw into the bore of the third screw to maintain the substantially constant gap between the respective support structures of the second and third plates;

wherein a gap between the respective sides of the first and second plates is different from a gap between the respective sides of the second and third plates.

* * * * *